HOLOGRAPHIC MATCHED FILTER PATTERN RECOGNITION TECHNIQUE

Filed May 16, 1967

INVENTORS
C. B. BURCKHARDT
R. J. COLLIER
BY
Roderick B. Anderson
ATTORNEY

United States Patent Office 3,483,513
Patented Dec. 9, 1969

3,483,513

HOLOGRAPHIC MATCHED FILTER PATTERN RECOGNITION TECHNIQUE

Christoph B. Burckhardt, Berkeley Heights, and Robert J. Collier, New Providence, N.J., assignors to Bell Telephone Laboratories, Incorporated, Murray Hill and Berkeley Heights, N.J., a corporation of New York Filed May 16, 1967, Ser. No. 638,950
Int. Cl. G06k *9/00, 9/08;* G02b *5/18*
U.S. Cl. 340—146.3 19 Claims

ABSTRACT OF THE DISCLOSURE

Methods are disclosed for improving the character discrimination of optical pattern recognition devices that use holograms to store their reference information. The distinctive elements of a pattern are identified and then emphasized during the process of forming the reference hologram by varying the exposure of the hologram recording medium to the different elements. These variations may be achieved by illuminating the different elements in separate exposures and using for the different exposures different intensities of light, or different exposure times or different optical path lengths (different phases). When the pattern to be stored is a transparency through which part of the hologram forming light is projected, these variations may be achieved by varying the transmittivity or the optical path lengths of the different elements of the pattern.

BACKGROUND OF THE INVENTION

The basic principles of holography were disclosed by D. Gabor in his article "A New Microscopic Principle," appearing at page 777, vol. 161 of Nature (May 15, 1948). Not until recently, however, has extensive research been conducted in this field. A convenient summary of much of this work can be found in R. J. Collier's review "Some Current Views on Holography" at page 67 of the July 1966 issue of vol. 3 of the IEEE Spectrum.

One use of holographic techniques, as detailed by A Vander Lugt in "Signal Detection by Complex Spatial Filtering" appearing at page 139 of April 1964 issue of vol. IT–10 of the IEEE Transaction on Information Theory, is for pattern recognition. Vander Lugt's work has shown that if light from a reference beam is made to interfere with light that has illuminated a given pattern, and if a permanent record, a reference hologram, is made of the resulting interference fringes, then this hologram can be used to recognize the pattern at a later date. Merely by projecting light from an unknown pattern through the reference hologram, it is possible to get an output that can, in most cases, be analyzed to determine whether the unknown pattern is similar to the pattern used to form the reference hologram.

However, in some cases, the output is such that it is very difficult to determine whether the unknown pattern is the same as the stored pattern. As Armitage and Lohmann report in "Character Recognition by Incoherent Spatial Filtering," appearing at page 1666, vol. 4 of Applied Optics (April 1965), many patterns are so similar that for a given reference hologram they will produce outputs that are scarcely distinguishable. Thus, where Q is the pattern stored and O the unknown pattern presented for recognition, the intensity of the output will be 96 percent of the intensity of the output were a Q the unknown pattern. Similarly, the output of the pattern recognition device is the same for every unknown pattern that contains the pattern stored in the reference hologram. Thus where O is the pattern stored, the output is the same whether an O or a Q be the unknown pattern.

SUMMARY OF THE INVENTION

Accordingly, it is an object of this invention to improve pattern recognition.

It is a further object of this invention to improve pattern recognition in systems in which reference information is stored on holograms.

These and other objects of our invention are achieved by a process of identifying the distinctive elements of the patterns whose holograms are to be stored and then emphasizing those parts through one or more techniques. Thus, as between the pattern of a Q and the pattern of an O, the distinctive element of the Q is its tail; and it is this component that would be emphasized in practicing our invention.

As before, a reference hologram is formed by interfering a reference beam with light that has illuminated the pattern to be stored. In the usual case, a photosensitive medium is then exposed to the fringe pattern formed by the interfering beams and is later developed. However, we have found that if the exposure of the photosensitive medium to the distinctive part of the pattern to be stored is separated from its exposure to the other parts, and if the characteristics of the fringe pattern associated with the distinctive part are altered in some detectable fashion, a reference hologram can be produced that will have greater discrimination capacity than a reference hologram produced without our invention. Of course it is necessary to take care to avoid overexposing the photosensitive medium; but with presently available film this should not present any problem.

There are several ways to alter the recorded characteristics of the fringe pattern formed by the interfering beams, such as varying the intensity of either or both the reference beam and the light that illuminated the pattern or varying the length of time for which the photosensitive medium is exposed to the fringe pattern. Since a hologram preserves the phase of the pattern that is recorded, it is possible to record portions of a pattern with a phase different from that of the rest of the pattern. This technique is useful for attaching negative emphasis to certain portions of a pattern. As can be appreciated, there are also many different ways to vary the intensity, or the exposure time, or the phase relation of the light incident on the recording medium.

Once a reference hologram is formed by our process it can then be used for pattern detection simply by projecting light from an unknown pattern through the reference hologram. The resulting output can then be analyzed to determine whether the unknown pattern is similar to the pattern used to form the reference hologram. By using our invention it will be possible to increase the differences between the outputs of similar patterns.

DESCRIPTION OF THE DRAWING

These and other objects and features of the invention will be better understood from a consideration of the following detailed description taken in conjunction with the accompanying drawing in which.

DETAILED DESCRIPTION

Figure 1:
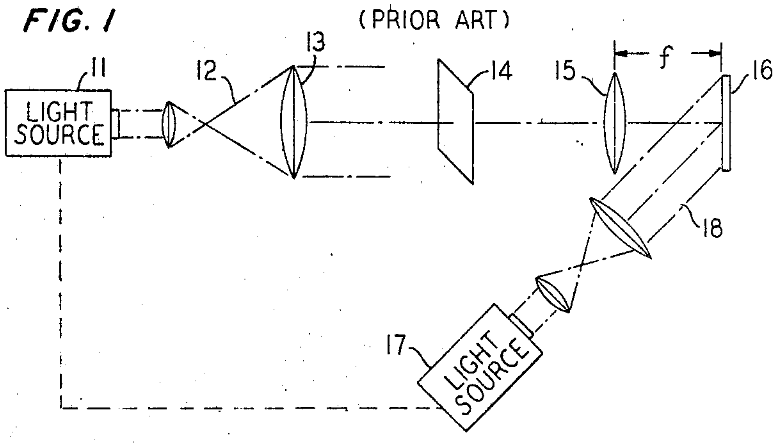
FIG. 1 (PRIOR ART)
FIG. 1 is a schematic illustration of apparatus used to form reference holograms.

Referring now to FIG. 1, there is shown apparatus of the prior art that is used for forming Fourier transform reference holograms. The apparatus comprises a coherent light source 11, a collimating lens 13, a transparency of the pattern to be stored 14, an objective lens 15, a photographic plate 16 located in the focal plane of lens 15, and a coherent light source 17. Since reference beam 18 emanating from source 17 should be phase-related to subject beam 12 emanating from source 11, it is best to use a system of beam splitter and mirrors to derive reference beam 18 from subject beam 12. However, to avoid undue complication of FIG. 1, the common origin of the two beams is indicated simply by a dotted line between source 11 and source 17.

To form the reference hologram, coherent light is directed from source 11 through lens 13, transparency 14 and lens 15 to photographic plate 16. At the same time, phase-related light is directed from light source 17 onto photographic plate 16. Inasmuch as there is an angle between the subject beam 12 and the reference beam 18, a set of interference fringes will be formed on photographic plate 16. Inasmuch as transparency 14 diffracts light beam 12, the set of interference fringes will be characteristic of transparency 14.

When the exposure is completed, the photographic plate can be developed and will then be ready for use as a reference hologram in a pattern recognition system. However, since such a reference hologram can detect only one pattern, it is more customary to expose the plate to not one but several patterns before developing. If this is done, to obtain nonoverlapping signals in output plane 122 of FIG. 2, the direction of reference beam 18 has to be different for each pattern recorder.

For convenience of description we have outlined the formation of a Fourier transform hologram of a pattern transparency. While it is not necessary that our invention be practiced using such a hologram, pattern detection with Fourier transform holograms is a well-known technique that can detect patterns regardless of their location on a transparency that is submitted for recognition. However, anyone skilled in the art will understand how to adapt our invention to other hologram forming techniques. For example, where pattern transparencies are not used, our invention may be practiced merely by reflecting the illuminating beam off the pattern to be stored; and, of course, the Fourier transform lens need not be used where location insensitivity is not desired. Moreover, although photographic plates and photographic films are now the standard recording media, anyone skilled in the art will know how to adjust our invention to use it with the other media presently being adapted to hologram recording.

Figure 2:
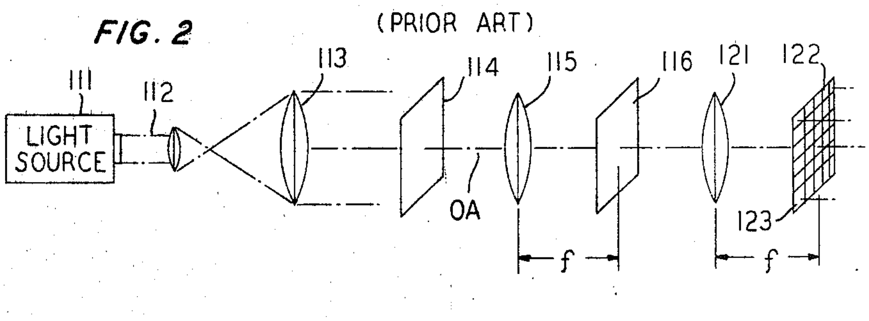
FIG. 2 (PRIOR ART)
FIG. 2 is a schematic illustration of apparatus used in pattern recognition.

Referring now to FIG. 2, there is shown pattern recognition apparatus of the prior art that could be used with Fourier transform reference holograms. The apparatus comprises coherent light source 111, a collimating lens 113 the pattern to be recognized 114, an objective lens 115, the reference hologram 116 located in the focal plane of lens 115, an imaging lens 121 and an output plane 122 located in the focal plane of lens 121 containing an rray of photodetectors 123, all located along an optical axis OA. A coherent light beam 112 from source 111 is directed through lens 113, through the object to be identified 114 and lens 115, and through hologram 116. If the unknown pattern 114 contains the pattern used to form the reference hologram 116, there will appear on the output plane 122 a small spot of high intensity light.

More accurately, three light beams or spots will be projected from hologram 116, one zero-order beam and two first-order beams. One of these spots will be the cross-correlation of the unknown pattern and the pattern stored on the hologram. It is this spot that is used for recognition. Where more than one pattern has been stored in the reference hologram, care must be taken when recording the hologram to insure that no confusion between the patterns detected arises because of variations in the location of the unknown pattern 114. This can be accomplished by using sufficiently large variations in angles between the subject and the reference beam during recording that there is no overlap between the areas on the output plane associated with each pattern recorded.

Recognition is made by measuring the intensities in the output area with, for example, photodetectors 123 located in plane 122. This is followed by some processing such as thresholding or selecting the spot with the highest intensity or even something more complicated that would involve connecting the photodetectors to a network of logic circuits. The particular arrangement used in any recognition system will depend on the storage capacity of the reference hologram and the discrimination abilities of the photodetectors and their associated logic circuitry.

Because of very close similarity between two patterns, it sometimes happens that the photodetectors receive nearly identical signals from different unknown patterns. To improve the discrimination between signals such as these, the pattern to be recorded is analyzed in our invention to determine its distinctive characteristics. Following the procedures detailed in conjunction with FIG. 1, an exposure is then made of at least the nondistinctive features. Then a separate exposure is made of the distinctive elements of the pattern, but with such a variation in the properties of at least one of the light beams incident on the recording medium that the fringe pattern associated with the distinctive part differs in some detectable characteristic from the fringe pattern of the distinctive part that would be formed were the distinctive part illuminated and its fringe pattern recorded the same as the nondistinctive part.

Figure 3:
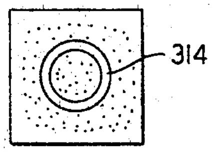
FIGS. 3, 4 and 5 are illustrations of pattern transparencies suitable for use with the apparatus of FIGS. 1 and 6.
Figure 4:
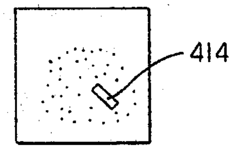
Figure 5:
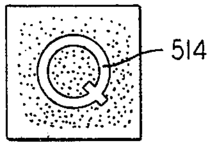

For a better understanding of how our invention may be practiced, we will now show in conjunction with FIGS. 1, 3, 4 and 5 how the differences between the patterns of the two letters O and Q are emphasized when forming a reference hologram of the pattern of the letter Q in accordance with our invention. FIG. 3 depicts the pattern transparency 314 of the letter O, which has been determined to be the nondistinctive part of the letter Q, suitable for use with the recording system of FIG. 1. FIG. 4 depicts the pattern transparency 414 of a slash mark (\), which has been determined to be the distinctive part of the letter Q. And FIG. 5 the pattern transparency 514 of the letter Q. The three patterns are of such size and shape that if the patterns of the O and the \ are superimposed they will produce the pattern of the Q. For convenience in practicing our invention the pattern transparency of the letter O can be formed from the transparency of the letter Q merely by masking the tail of the Q. Similarly the pattern transparency of the slash mark can be formed from the transparency of the letter Q simply by masking the O shape. And, in general, a transparency of an element of a pattern can be formed simply by masking the rest of the pattern transparency.

As can be understood from the description in conjunction with FIG. 1, if transparency 314 of the letter O is mounted in place of pattern to be stored 14 and if a reference beam and light from the transparency are directed onto photographic plate 16, there is recorded on the plate the fringe pattern associated with the letter O. And upon development of the photographic plate there is produced a reference hologram of the letter O suitable for use in a character recognition system. Even if, before developing, a hologram of transparency 414 of the slash mark were produced on the same photographic plate in the same way as the hologram of transparency 314 was produced, there still would be produced upon development of the photographic plate simply a reference hologram of the letter Q. Although formed in two separate exposures, because each exposure was identical this hologram would have no better discrimination ability than a reference hologram formed in one exposure.

In our invention, however, although the same steps are followed in forming the hologram, at least one of the characteristics of the light in the two exposures is varied in order to produce different exposures. Thus, to form a reference hologram of the letter Q, transparency 314 of the letter O, the nondistinctive part is mounted in the apparatus of FIG. 1 in place of element 14; and an exposure is made of this. Then transparency 314 is replaced in the apparatus by transparency 414 of the slash mark, the distinctive part; and by using an exposure time or a light intensity at source 111 different from that used in the first exposure, a different exposure is made of this. As a result, the interference fringes on the photographic plate, although of the same shape, are different from the interference fringes that would have been formed had the whole pattern been exposed in a single exposure or had the two elements been exposed for separate but identical exposures.

Thus, if the slash mark 414, the tail of the Q, is exposed for a longer time or at a higher instensity of light than the transparency 314 of the letter O is exposed, there will be formed on photographic plate 16 a set of interference fringes associated with the tail features having greater contrast than they otherwise would have. Since the hologram produced upon development of the photographic plate is essentially a diffraction grating, those fringes with greater contrast will diffract more of the light incident on them than they would without the increased contrast. Thus, when a hologram formed by our process is subsequently used in detection apparatus such as that depicted in FIG. 2, the presence in the unknown pattern 114 of that feature that was emphasized during the formation of the hologram will cause a more intense recognition signal to be projected along the real image path onto output plane 122 than would have been projected had our invention not been practiced during formation of the hologram.

Moreover, since only the fringes associated with the distinctive element of the pattern have the greater contrast, the difference between the signal that is projected onto plane 122 when the distinctive feature is present in the pattern 114 to be detected and the signal that is projected when the distinctive feature is not present will be much greater from what it would be had our invention not been practiced during the formation of the hologram. Thus, where the letter Q is stored by prior art techniques in the reference hologram, the signals received at that portion of the output plane that detects the letter Q would have a relative value of 1.0 when a Q is presented and a value of 0.96 when an O is presented. However, if the tail of the Q is emphasized by using a longer exposure time or a higher intensity of light, the value of the signal when a Q is presented might be 1.2 while the value when an O is presented remains at 0.96. Because the difference between the signals when our invention is used is so much greater, the discrimination of the recognition system between the signals associated with the two letters will be much enhanced.

It is also possible in practicing our invention to give negative emphasis to an element of a pattern. This is accomplished during the formation of the hologram by phase shifting the light asociated with the element to be de-emphasized. This technique can also be used to emphasize the absence of an element of a pattern, for example, the absence of a tail in the letter Q, as a means for distinguishing between two patterns. In the two character example of the letters O and Q, of course, it does not make any difference whether the presence of the tail in the letter Q or the absence of the tail in the letter O is emphasized. For large sets of characters, however, it is a definite advantage to have the possibility of attaching negative weight to certain elements of the pattern.

Figure 6:
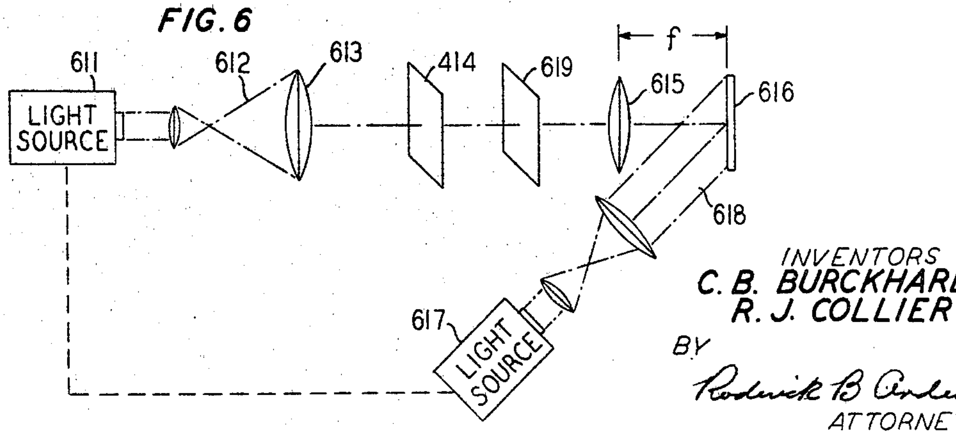
FIG. 6 is a schematic illustration of apparatus used to form reference holograms according to one embodiment of our invention.

The process for forming a hologram of a pattern with emphasis on the absence of a distinctive element in that pattern is similar to the process described for storing a hologram of a pattern such as the letter Q with emphasis on the presence of the tail. First the nondistinguishing part, the circular portion, is stored by following the steps outlined in our discussion of FIG. 1. Then the distinguishing portion, the tail, is stored by using similar apparatus such as that depicted in FIG. 6. A subject beam 612 is projected from coherent light source 611 through collimating lens 613, through transparency of a slash mark 414, through half-wave plate 619, through objective lens 615, onto photographic plate 616 where it interferes with reference beam 618 projected from light source 617 to form a set of interference fringes. This apparatus is set up exactly the same as the apparatus in FIG. 1; and, as indicated by the dotted line between light source 611 and light source 617, reference beam 618 is derived from subject beam 612. However, before light from the distinctive element, the tail, reaches the photographic plate, the phase relation of the two light beams is changed, preferably by inserting in one of the beams a one-half wave plate 619 that will introduce a phase shift of 180° but conceivably by inserting any medium that will introduce a phase shift. It is not necessary to shift the phase of the subject beam by the method depicted in FIG. 6. The phase of the subject beam could also be shifted before the beam is incident on transparency 414 or the phase of the reference beam could be shifted. Likewise, although a phase shift of 180° will produce that best results, it is only necessary in practicing this embodiment of our invention that the phase relation between the subject beam and the reference beam during the second illumination be different from that during the first illumination.

The effect of phase shifting is to shift the location of the fringe pattern formed on the photographic plate by a fraction of the distance between adjacent fringes. When the photographic plate is processed to form a reference hologram and used in a pattern recognition device such as that of FIG. 2, the effect of the shift in the fringe pattern on the intensity of the light in the output plane is a destructive interference in which the phase-shifted light is subtracted from that which is not phase-shifted. Although the eye or any other intensity detection device, such as a photodetector, is insensitive to phase shifts and although the hologram will project the same output as long as all of the hologram is phase-shifted the same amount, when part of the information on a hologram is phase-shifted and part is not, the ultimate effect on light intensity can be detected by any intensity detection device. Thus, if a comparison is made between the signals received when an O and a Q are presented to the reference hologram formed by first illuminating the circular portion 314 and then illuminating and phase shifting the tail portion 414, the letter O will register a light intensity greater than that of the letter Q because the light from the tail of the Q will, in effect, me subtracted from the light from the circular parts.

Where pattern transparencies are used in forming the reference hologram, these same effects may be conveniently achieved in one exposure rather than two if the transparency is made with our invention in mind. Thus, for example, if the transparency 314 of the letter O is combined with the transparency 414 of the slash mark to make one transparency of the letter Q and if the transmittivity of the circular portions of the transparency of the letter Q is made less than the transmittivity of the tail portion, more light per unit area will be transmitted through the tail portion than through the circular portion. If such a transparency is used in connection with the apparatus shown in FIG. 1, it will have the same effect on the photographic plate as if the tail portion of the letter Q was exposed at higher intensities or for a longer time than the circular portion. Similarly, if transparency 314 is combined with transparency 414 to make one transparency of the letter Q and if a one-half-wave plate is built into either the transparency of the circular portion of the letter Q or the transparency of the tail, the effect on the photographic plate will be the same as if a one-half-wave plate was inserted into either the subject or the reference beam when forming the hologram of the tail as detailed in the discussion of FIG. 6.

As suggested by the fact that only one exposure is needed if the transparency has areas of different transmittivity, when emphasizing the distinctive element of a pattern it is not necessary to mask the distinctive element during the exposure of the other elements of the pattern. The effects of the different exposures are cumulative within a certain range. Hence, if a distinguishing feature is also exposed while a nondistinguishing feature is exposed, the effect is only to give further exposure to the distinguishing feature. This would be the same as exposing the distinguishing feature for an additional time at the same light intensity as that used to expose the nondistinguishing feature. However, where phase-shifting techniques are used, the elements that are to be phase shifted should be masked when the remaining elements are illuminated without phase-shifting. Otherwise, the phase-shifted light and the non-phase-shifted light associated with the same distinctive elements will cancel each other.

Within certain limits the above processes are compatible with one another. Thus, for a given pattern it may be desirable to emphasize some parts by using light of a higher intensity than that used with others, while still other parts are emphasized by illuminating them for a longer period than others. At the same time, the process of phase shifting the light from some elements may be used. Of course, the emphasis that may be given is governed by the limits of the total amount of exposure to which the photographic plate may be subjected.

As can be appreciated by anyone skilled in the art, our invention admits of many variations in its practice. The descriptions of practice that we have given are merely illustrative of what can be done with the invention. Numerous other modifications can be made by those skilled in the art without departing from the spirit and scope of the invention.

What is claimed is:

1. In a process for forming a reference hologram of a pattern having both an element similar to at least part of another pattern and a distinctive element that comprises the steps of:

interfering on a recording medium two beams of light for a suitable exposure, one of which beams is modulated by the pattern to be recorded, thereby forming on the recording medium a set of interference fringes, a first part of which is related to the similar element in the pattern to be recorded and a second part of which is related to the distinctive element;

the location of the fringes on the recording medium being dependent on the phase relation between the two beams;

the fringe contrast being dependent on the exposure of the recording medium to the fringes;

a first exposure ratio being defined as the ratio of the exposure of the recording medium to the second part of the set of interference fringes to the exposure of the recording medium to the first part of the set of interference fringes;

the improvement characterized by:

forming the first part of the set of interference fringes by projecting onto the recording medium a first and a second beam of light, the first beam being modulated by the similar element of the pattern to be recorded;

and forming a different second part of the set of interference fringes by projecting onto the medium a third and a fourth beam of light, the third beam being modulated by the distinctive element of the pattern to be recorded;

a second exposure ratio being defined as the ratio of the exposure of the recording medium to the different second part of the set of interference fringes to the exposure of the recording medium to the first part of the set of interference fringes; and at least one of the phase relations between the third and fourth beams and the second exposure ratio being different from the phase relation between the first and second beams and the first exposure ratio.

2. The process of claim 1 wherein:

the first and second beams of light and the third and fourth beams of light are derived from a common light source by means of a beam splitter;

an angle between the first and second and an angle between the third and fourth beams are created by a system of light deflectors; and the reference hologram is formed in a Fourier transform plane by inserting between the pattern to be recorded and the recording medium a converging lens located a focal length away from the recording medium.

3. The process of claim 1 wherein the recording medium is a photographic emulsion that is developed, after exposure to both the similar and the distinctive elements of the pattern to be recorded, to make at least a temporary record of the interference fringes incident on it.

4. In a process for forming a reference hologram of a pattern having both an element in common with any other pattern and a distinctive element that comprises the steps of:

interfering on a recording medium two beams of light for a suitable exposure one of which beams is modulated by the pattern to be recorded, thereby forming on the recording medium a set of interference fringes, a first part of which is related to the common element in the pattern to be recorded and a second part of which is related to the distinctive element;

the fringes having a location on the recording medium that is dependent on the phase relation between the two beams;

the improvement characterized by:

forming the first part of the set of interference fringes by projecting onto the recording medium a first and a second beam of light, the first beam being modulated by the common element of the pattern to be recorded;

and forming a different second part of the set of interference fringes by projecting onto the medium a third and a fourth beam of light, the third beam being modulated by the distinctive element of the pattern to be recorded; and the phase relation between the third and fourth beams being different from the phase relation between the first and second beams.

5. The process of claim 4 wherein forming a different second part of the set of interference fringes by changing the phase relation between the third and fourth beams from that between the first and second beams comprises the step of:

transmitting one of the four beams through a one-half-wave plate.

6. The process of claim 4 wherein forming a different second part of the set of interference fringes by changing the phase relation between the third and fourth beams from that between the first and second beams comprises the steps of:

forming a first transparency of the pattern composed of a second transparency of the common element of the pattern having a first optical path length and a third transparency of the distinctive element of the pattern having a second optical path length;

the difference between the two optical path lengths being other than an integral multiple of the wavelength of the first and third beam of light;

and using the first transparency to modulate the first and third beams of light.

7. In a process for forming a reference hologram of a pattern having both an element in common with any other pattern and a distinctive element that comprises the steps of:

interfering in a recording medium two beams of light for a suitable exposure one of which beams is modulated by the pattern to be recorded, thereby forming on the recording medium a set of interference fringes, a first part of which is related to the common element in the pattern to be recorded and a second part of which is related to the distinctive element;

the fringes having a contrast between every light and dark fringe that is dependent on the exposure of the recording medium to the fringes;

a first exposure ratio being defined as the ratio of the exposure of the recording medium to the second part of the set of interference fringes to the exposure of the recording medium to the first part of the set of interference fringes;

the improvement characterized by:

forming the first part of the set of interference fringes by projecting onto the recording medium a first and a second beam of light, the first beam being modulated by the common element of the pattern to be recorded;

and forming a different second part of the set of interference fringes by projecting onto the medium a third and a fourth beam of light, the third beam being modulated by the distinctive element of the pattern to be recorded;

a second exposure ratio being defined as the ratio of the exposure of the recording medium to the different second part of the set of interference fringes to the exposure of the recording medium to the first part of the set of interference fringes;

the second exposure ratio being different from the first exposure ratio.

8. The process of claim 7 wherein the different second part of the set of interference fringes is formed by projecting onto the recording medium the third and fourth beams of light for an exposure time different from that for which the first and second beams are projected.

9. The process of claim 8 wherein the common element and the distinctive element simultaneously modulate the first and third beams of light respectively for at least some time;

the different second part of the set of interference fringes being formed by projecting onto the recording medium the third and fourth beams of light for a different exposure time than that for which the first and second beams are projected.

10. The process of claim 8 wherein forming a different second part of the set of interference fringes by varying the exposure ratio comprises the steps of:

forming a first transparency of the common element;

forming a second transparency of the distinctive element;

using the first transparency to modulate the first beam of light;

and using the second transparency to modulate the third beam of light;

the exposure time of the third beam of light being different from the exposure time of the first beam of light.

11. The process of claim 7 wherein the different second part of the set of interference fringes is formed by projecting onto the recording medium at least one of the third and fourth beams of light at an intensity different from that at which the first and second beams are projected.

12. The process of claim 11 wherein forming a different second part of the set of interference fringes by varying the exposure ratio comprises the steps of:

forming a first transparency of the common element;

forming a second transparency of the distinctive element;

using the first transparency to modulate the first beam of light;

and using the second transparency to modulate the third beam of light;

the intensity of at least one of the third and fourth beams of light being different from the intensity of the first and second beams of light.

13. The process of claim 7 wherein forming a different second part of the set of interference fringes by varying the exposure ratio comprises the steps of:

forming a first transparency of the common element having a first transmittivity;

forming a second transparency of the distinctive element having a second and different transmittivity;

using the first transparency to modulate the first beam of light;

and using the second transparency to modulate the third beam of light.

14. The process of claim 7 wherein forming a different second part of the set of interference fringes by varying the exposure ratio comprises the steps of:

forming a first transparency of the pattern composed of a second transparency of the common element of the pattern having a first transmittivity and a third transparency of the distinctive element of the pattern having a second and different transmittivity;

and using the first transparency to modulate the first and third beams of light simultaneously.

15. A process for recognizing one of more than one pattern where the pattern to be recognized has both an element similar to as least part of another pattern and a distinctive element that comprises the steps of:

forming a reference hologram of the pattern to be recorded comprising the steps of:

interfering on a recording medium two beams of light for a suitable exposure one of which beams is modulated by the pattern to be recorded, thereby forming on the recording medium a set of interference fringes, a first part of which is related to the similar element in the pattern to be recorded and a second part of which is related to the distinctive element;

the location of the fringes on the recording medium being dependent on the phase relation between the two beams;

the contrast between a light and dark fringe being dependent on the exposure of the recording medium to the fringes;

a first exposure ratio being defined as the ratio of the exposure of the recording medium to the second part of the set of interference fringes to the exposure of the recording medium to the first part of the set of interference fringes;

and determining whether an unknown pattern is the same as the pattern recorded comprising the steps of:

forming a cross correlation of a beam of light modulated first by the unknown pattern and then by the reference hologram;

detecting the intensity of the cross correlation;

comparing the intensity of the cross correlation of the beam with the intensity of the cross correlation of a beam of light that is modulated by the pattern recorded and its reference hologram;

and indicating that the unknown pattern is the same as the pattern recorded when the intensities are substantially the same;

the improvement characterized by:

forming the first part of the set of interference fringes by projecting onto the recording medium a first and a second beam of light, the first beam being modulated by the similar element of the pattern to be recorded;

and forming a different second part of the set of interference fringes by projecting onto the medium a third and a fourth beam of light, the third beam being modulated by the distinctive element of the pattern to be recorded;

a second exposure ratio being defined as the ratio of the exposure of the recording medium to the different second part of the set of interference fringes to the exposure of the recording medium to the first part of the set of interference fringes;

at least one of the phase relations between the third and fourth beams and the second exposure ratio being different from the phase relation between the first and second beams and the first exposure ratio;

as a result of which, a ratio of the intensity of the cross correlation formed when the unkown pattern is the same as the pattern recorded on the improved reference hologram to the intensity when the unknown pattern is not the same is different from the intensity ratio when the reference hologram of the two parts is formed without varying the phase relation or the exposure ratio.

16. The process of claim 15 wherein the cross correlation of the beam of light is formed in an output plane by inserting between the reference hologram and the output plane a converging lens to image the beam of light onto the output plane situated a focal length away from the lens;

the intensity is indicated by an array of photodetectors;

the intensity of the cross correlation is compared with the intensity of known cross correlations by biasing the photodetectors at predetermined threshold levels;

and recognition is indicated by optoelectronic means.

17. The process of claim 15 wherein more than one pattern is stored in a single reference hologram comprising the steps of:

repeating the step of interfering two beams of light on the recording medium as many times as is necessary to record each pattern to be recorded;

a different angle being used between the two beams for each pattern that is recorded.

18. A process for forming a hologram of a pattern for use in pattern discrimination apparatus that comprises the steps of:

dividing the pattern into a first element comprised of at least those parts that are common to the pattern and to any pattern to be discriminated and into a second element comprised of those parts that are distinctive;

forming a set of interference fringes on a recording medium by projecting onto the medium two beams of light of predetermined characteristics for a suitable exposure one of which beams is modified by the first element of the pattern;

forming a second set of interference fringes on the recording medium by projecting onto the medium the two beams of light for a second exposure one of which beams is modified by the second element of the pattern;

each pair of beams of light being derived from the same light source;

at least one of the exposure time, the total intensity as measured at the light source, and the phase relation of the two beams being different during the second exposure from what it was during the first exposure;

and processing the medium to make at least a temporary record of the interference fringes.

19. A process for forming a hologram of a pattern for use in pattern discrimination apparatus that comprises the steps of:

dividing the pattern into a first element comprised of those parts that are common to the pattern and to any pattern to be discriminated and into a second element comprised of those parts that are distinctive;

forming a set of interference fringes on a recording medium by projecting onto the medium two beams of light of predetermined characteristics for a suitable exposure one of which beams is modulated partly by the first element of the pattern and partly by the second element of the pattern;

altering that part of the beam modulated by the second element of the pattern by changing at least one of its intensity per unit area, its optical path length, and the length of time for which it is incident on the recording medium form the corresponding characteristics of the other part of the beam;

and processing the medium to make at least a temporary record of the interference fringes.

References Cited

UNITED STATES PATENTS

| | | |
|---|---|---|
| 3,124,636 | 3/1964 | Fitzmaurice. |
| 3,195,396 | 7/1965 | Horwitz et al. |

OTHER REFERENCES

Gabor et al. "Optical Image Synthesis (Complex Amplitude Addition and Subtraction) by Hollographic Fourier Transformation," Physics Letters, vol. 18, No. 2, pp. 116–118 (August 1965).

DAVID SCHONBERG, Primary Examiner

R. L. SHERMAN, Assistant Examiner

U.S. Cl. X.R.

235—181; 350—3.5, 162; 356—71